No. 881,122.　　　　　　　　　　　　　　　PATENTED MAR. 10, 1908.
F. H. HODGKINS.
SPEED MECHANISM.
APPLICATION FILED AUG. 21, 1905.
3 SHEETS—SHEET 3.
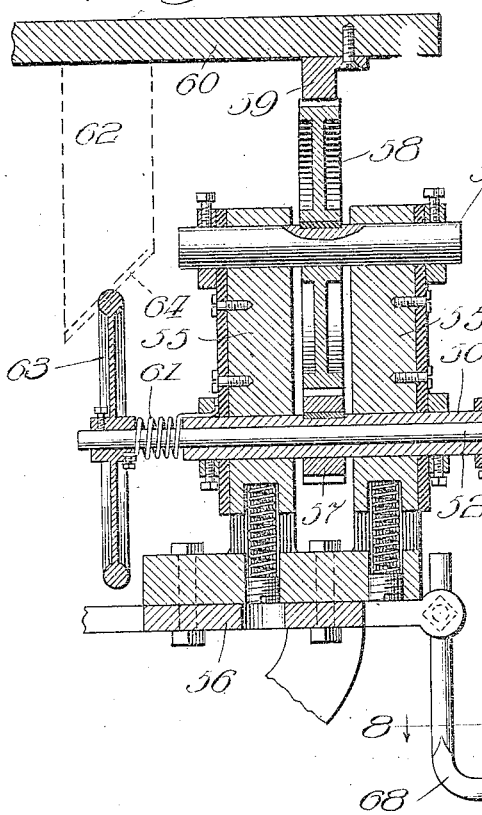
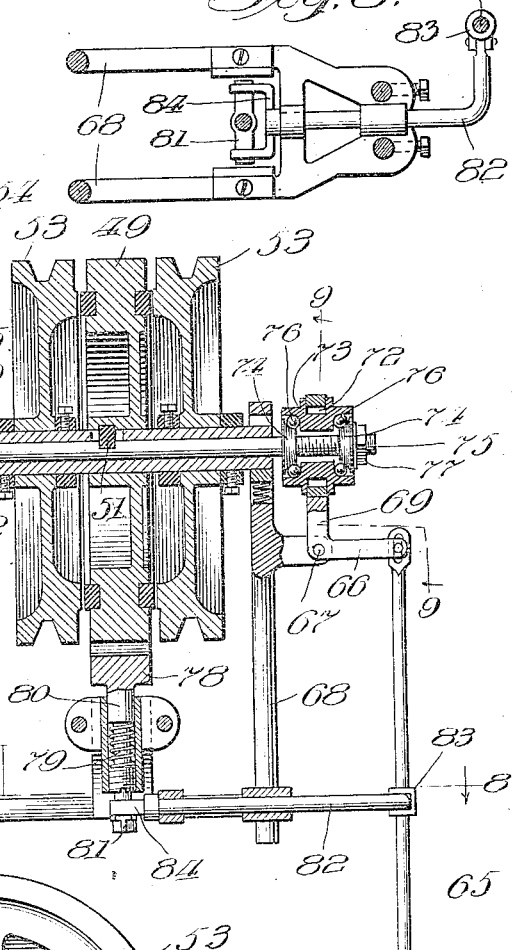
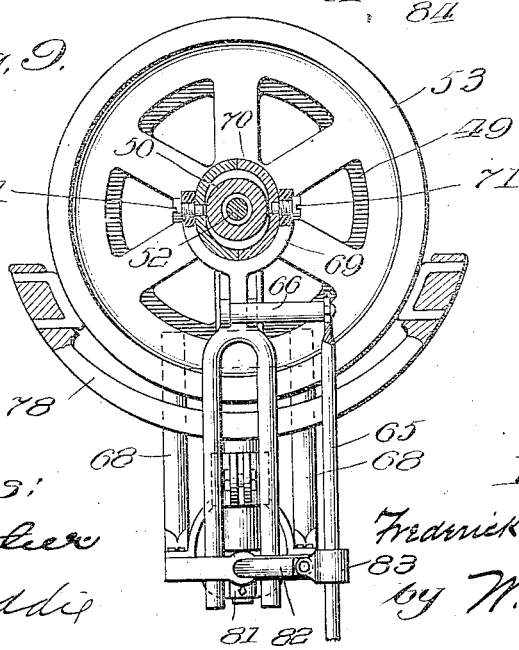
Witnesses:
H. S. Gaither
M. A. Kiddie
Inventor.
Frederick H. Hodgkins
by Wm. T. Bell
atty

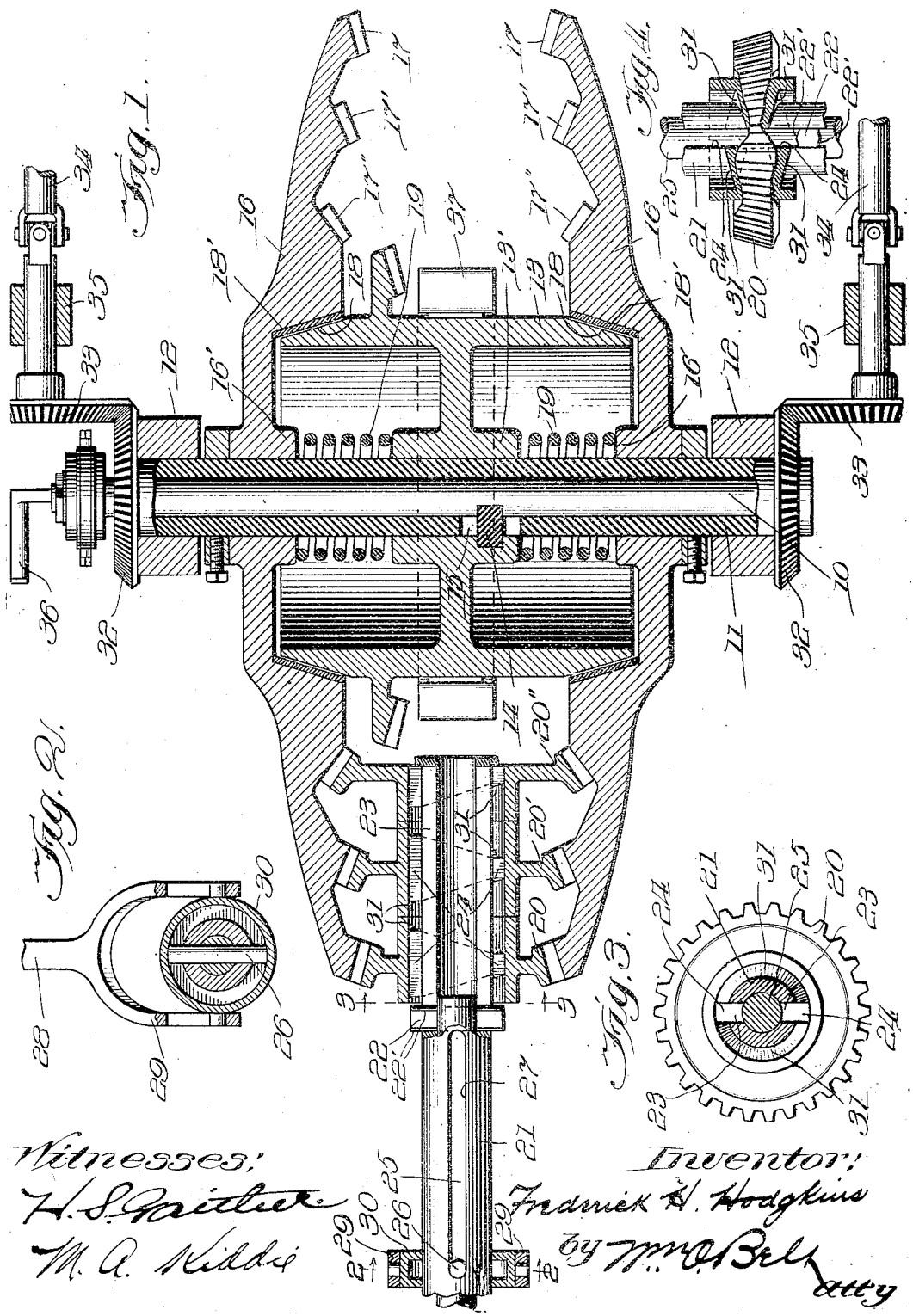

UNITED STATES PATENT OFFICE.

FREDERICK H. HODGKINS, OF CHICAGO, ILLINOIS.

SPEED MECHANISM.

No. 881,122.     Specification of Letters Patent.     Patented March 10, 1908.

Application filed August 21, 1905. Serial No. 275,035.

*To all whom it may concern:*

Be it known that I, FREDERICK H. HODGKINS, a citizen of the United States, residing at Chicago, in the county of Cook and State of Illinois, have invented new and useful Improvements in Speed Mechanisms, of which the following is a specification.

This invention relates to speed mechanisms and its object is to provide a mechan ism of simple and inexpensive construction which is adaptable for various purposes and which may be constructed to impart a forward and reverse movement with or without a changeable speed in each movement.

Figure 5:
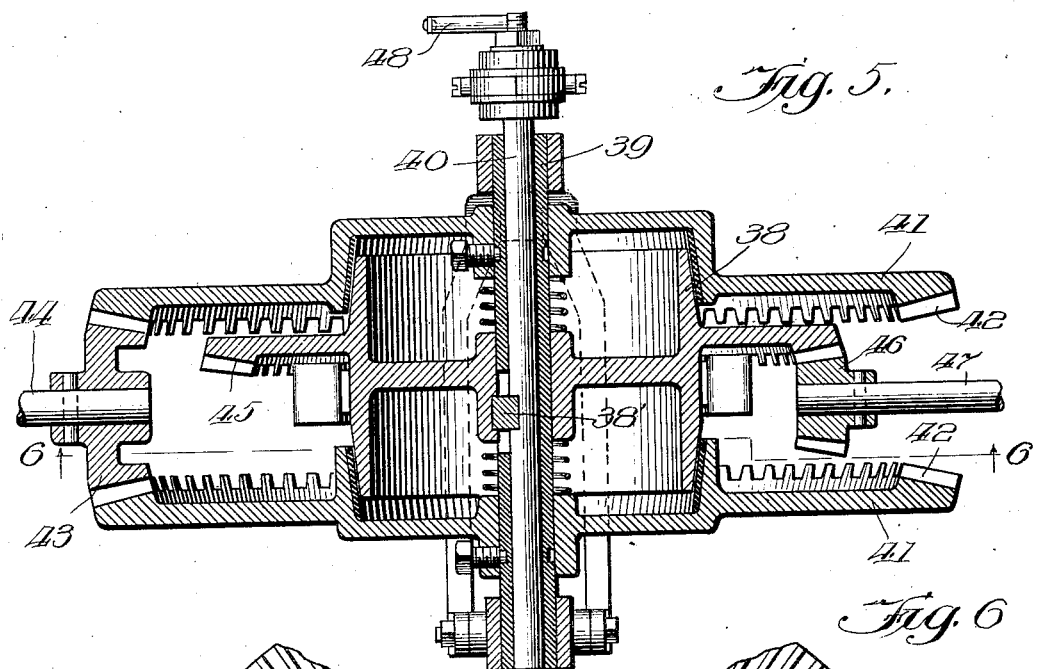
Figure 6:
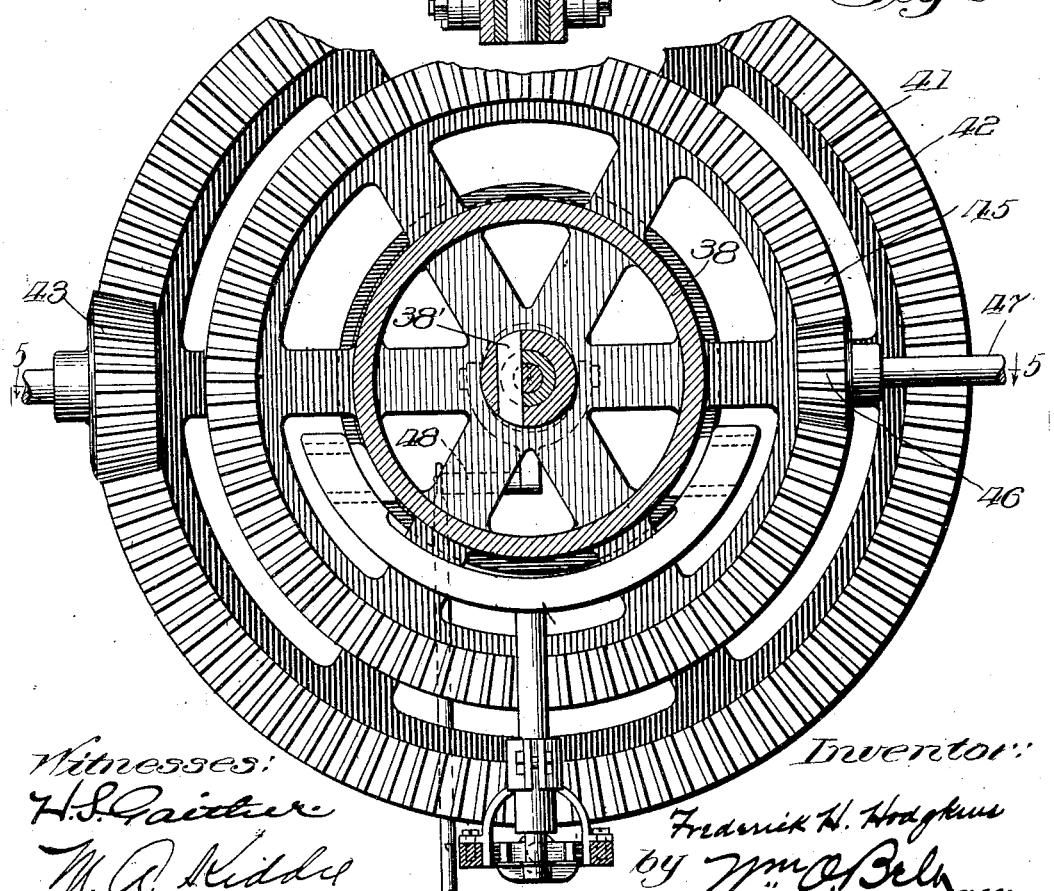

In the accompanying drawings I have shown the invention embodied in several forms and referring thereto Figure 1 is a sectional view illustrating the invention in a form providing a changeable speed. Fig. 2 is a sectional view on the line 2—2 of Fig. 1. Fig. 3 is a sectional view on the line 3—3 of Fig. 1. Fig. 4 is a detail view. Fig. 5 is a sectional view on the line 5—5 of Fig. 6. Fig. 6 is a sectional view on the line 6—6 of Fig. 5. Fig. 7 is a sectional view showing another embodiment of the invention. Fig. 8 is a sectional view on the line 8—8 of Fig. 7. Fig. 9 is a sectional view on the line 9—9 of Fig. 7.

Referring to Sheet 1 of the drawings 10 is a slidable shaft located within a hollow shaft 11 which is journaled in bearings 12 of a suitable character. A friction member 13 is slidably mounted on the hollow shaft and locked to the slidable shaft 10 by a key 14 which passes through a slot 15 in the hollow shaft. Driving members 16 are mounted on the hollow shaft at each end of the friction member, one driving member being employed for for ward movement and the other for reverse movement. In this construction the driving members are in the form of disks provided with three concentric sets of gear teeth forming, in effect, gears 17, 17', 17''.
The friction member has its ends beveled at 18 to make frictional engagement with the seats 18' on the driving members and the friction member is centered relative to the driving members by springs 19 located on the hollow shaft between the hub 13' of the friction member and the hubs 16' of the driving members. The driving members are driven by one of the driving pinions 20, 20', 20'' which are arranged in constant engage ment with the gears 17, 17', 17'', respectively, of the driving members. These pinions are loosely mounted on the hollow driving shaft 21 and they are adapted to be separately locked to said shaft by a key 22 which is adapted to travel lengthwise in a slot 23 in said shaft and in slots 24 in the hub of each pinion. (Fig. 3). The key is carried by a rod 25 which slides within the hollow shaft 21 and a pin 26 passes transversely through said rod and projects through slots 27 in the hollow shaft. The rod 25 is adjusted by means of an operating handle 28 which is provided with a yoke 29 at its lower end (Fig. 2) which carries a channeled collar 30 encircling the hollow shaft over the pin 26, the latter being adapted to revolve within the channel of said collar.

The handle 28 is operated to move the key 22 forward into locking engagement with one or the other of the pinions, the pinion 20 producing a low speed, 20' an intermediate speed and 20'' a high speed. In projecting the key forward into locking engagement with the high speed pinion 20'' it will first have to pass through the pinions 20, 20' and to facilitate the movement of the key in both directions through the pinions I prefer to bevel the key reversely on its front and rear faces 22' (Fig. 4) and also to provide cam faces 31 on both ends of the hub of each pinion. (Fig. 3). These cam faces are located on opposite sides of the slot 24, the high point of one cam being opposite the low point of the other cam. All of the pinions are con stantly revolving with the driving shaft 21 and therefore, when the key 22 is forced into engagement with the cams 31 on the pinion 20', for example, the speed of that pinion will be actuated to that of the shaft until the slot 24 in the pinion has come into register with the key, whereupon the key will enter the slot and make locking engagement with the pinion. The construction of the key and the cams on the pinions facilitate the move ment of the key so that the key may be moved from the high speed pinion 20'' to the low speed pinion 20 without any material interruption while passing through the intermediate pinion 20'.

This mechanism may be utilized to drive the rear axle of an automobile by mounting beveled gears 32 on the ends of the hollow shaft 11 to drive beveled gears 33 on the flexible shafts 34 mounted in suitable bear ings 35 and geared to the rear axle (not shown). The friction member 13 is adjusted by a lever 36 which is adapted to move the shaft 10 lengthwise in the hollow shaft 11 and is more particularly shown in Fig. 7 hereafter described. A brake device 37 is preferably provided to engage the friction member and this device is shown in Figs. 7 and 9 and will be described hereafter.

In Figs. 5 and 6 I have shown another application of the invention in which forward and reverse movements are provided for. In this construction a friction member 38 is mounted on a hollow shaft 39 and locked to the shaft 40 by a key 38' as heretofore described. The driving members 41 are mounted on the hollow shaft and each provided with a set of gear teeth to form gears 42 with which meshes the pinion 43 on driving shaft 44. The friction member carries a gear 45 with which meshes a pinion 46 on the driving shaft 47. The shaft 40 is adjusted to carry the friction member into frictional engagement with one or the other of the driving members 41 by means of a lever 48 connected therewith, this lever and its connections being more particularly shown in Figs. 7 to 9 and hereafter described. I have not shown and described the means for adjusting the shaft 10 in Fig. 1 and the shaft 40 in Fig. 5 in detail as it will be understood that this adjustment can be effected by means of any suitable character which will largely be determined by the use to which the mechanism is put.

In Figs. 7 to 9 I have shown my invention embodied in a simple form and adapted for reciprocating a table or platform. In this construction the friction member 49 is mounted on a hollow shaft 50 and locked by a key 51 to the slidable shaft 52 within the hollow shaft. The driving members 53 in this construction are belt pulleys and they are mounted on the hollow shaft 50. The hollow shaft and the shaft 54 are mounted in yielding bearing blocks 55 on a support 56 and the hollow shaft carries a pinion 57 which meshes with a gear 58 on the shaft 54. The gear 58 meshes with a rack 59 on a table 60. A spring 61 on the shaft 52 operates to center the friction member 49 between the driving members 53. A stop 62 can be suspended from the table to be engaged by a disk 63 on the end of the shaft 52 to adjust the shaft in the hollow shaft and move the friction member into engagement with one or the other of the driving members. For this purpose the stop may be provided with an inclined edge 64 which is engaged by the disk at the limit of the movement of the table in one direction, this inclined edge being shaped to move the disk and the shaft 52 so that the friction member 49 will be carried out of engagement with one friction disk and into engagement with the other friction disk to reverse the movement of the mechanism and the table. The shaft 52 is adjusted by a lever 65, the upper end of which is connected with one arm of a bell crank 66 pivoted at 67 on a bracket 68, the other end of said bell crank being made in the form of a yoke 69. This yoke carries a collar 70 which is made in two parts, each part being connected to an arm of the yoke by a pin 71 (Fig. 9), and the collar is arranged in the channel 72 of a sleeve 73. This sleeve forms part of a ball bearing on the end of the shaft 52, the cones 74 being screwed into place on the threaded end 75 of said shaft and the balls 76 arranged between said cones and the sleeve. The nut 77 holds the bearing in place on the shaft.

A brake shoe 78 is normally pressed into engagement with the friction member 49 by a spring 79 on a post 80 and this post is provided at its lower end with a cross bar 81 (Fig. 8). A rocking lever 82 is supported in the bracket 68 and swiveled at one end to a collar 83 on the rod 65. The other end of this rocking lever is provided with a yoke 84 the arms of which extend on opposite sides of the post 80 and bear upon the ends of the cross bar 81. When the rod 65 is operated to throw the friction member into engagement with one of the driving members the lever 82 will be rocked and one arm of the yoke 84 will bear upon one end of the cross bar 81 and release the brake shoe from engagement with the friction member; when the lever is operated to throw the friction member into engagement with the other driving member the shaft 82 will be rocked to cause the other arm of the yoke to engage the other arm of the cross bar for the same purpose.

The mechanism herein described can be used for many different purposes, being varied in details of construction to suit the particular applications. In the drawings I have shown the invention embodied first in a variable speed and reversing mechanism, second, in a reversing mechanism embodying gears and pinions and third, in a reversing mechanism in which the parts are operated by frictional engagement, and while the several mechanisms vary more or less as to the details of construction it will be observed that they all embody the same essential elements combined and arranged for accomplishing the improved results of the invention.

The mechanism is comparatively simple in its construction and operation and the embodiment illustrated on Sheet 1 will be found of special value for automobiles as it is strong and substantial in construction and enables a quick change from one speed to another forward or reverse.

In all the embodiments of the invention herein shown and described the driving members are loosely mounted on the hollow shaft and in those embodiments illustrated on Sheets 1 and 2 both driving members revolve at the same time but in opposite directions. It will be observed also that the machine in which the speed mechanism is combined may be stopped quickly by releasing the friction member from engagement with the driving members, this being done by operating the lever 36 to permit the springs 19 to center the friction member between the driving members in which operation the brake 37 is applied. This can be done without stopping the engine and therefore provides a safety stop for emergency use.

I have shown the mechanism constructed for three speeds in Fig. 1 but it will be understood that these may be multiplied by increasing the number of driving pinions and driving members.

What I claim and desire to secure by Letters Patent is:

1. In a speed mechanism, the combination of a hollow shaft, a slidable shaft in said hollow shaft, a friction member mounted on the hollow shaft and locked to the slidable shaft, driving members mounted on the hollow shaft at the ends of the friction member, each of the driving members having a seat and the ends of the friction member being shaped to engage the seats on the driving member, means for actuating said driving members, means for adjusting said slidable shaft to shift the friction member into operative engagement with one or the other of said driving members, and yielding means to move the friction member out of operative engagement with the driving members.

2. In a speed mechanism, the combination of a hollow shaft provided with a slot, a slidable shaft in said hollow shaft, a friction member mounted on the hollow shaft, a key locking the friction member to the slidable shaft and located in the slot of the hollow shaft, driving members mounted on the hollow shaft at the ends of the friction member, means for actuating said driving members, means for adjusting said slidable shaft to shift the friction member into operative engagement with one or the other of said driving members, a brake device to operate on said friction member, and yielding means to move the friction member out of operative engagement with the driving members.

3. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with oppositely disposed gears, a driving pinion meshing with said gears, means for adjusting said slidable shaft to shift the friction member into operative engagement with one or the other of said driving members, and yielding means to move the friction member out of operative engagement with the driving members.

4. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with a plurality of oppositely disposed and concentric gears, a plurality of driving pinions located between the driving members each of said pinions meshing with a gear on each driving member, a driving shaft, means for locking said driving shaft to any one of said pinions, means for adjusting said slidable shaft to shift the friction member into operative engagement with one or the other of said driving members.

5. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with a plurality of oppositely disposed and concentric gears, a hollow and slotted shaft located between said driving members, a plurality of driving pinions mounted on said hollow shaft each of said pinions meshing with a gear on each of said members, a driving shaft in said hollow shaft, a key carried by said driving shaft and adapted to be locked to any one of said pinions, means for adjusting the slidable shaft to shift the friction member into operative engagement with one or the other of said driving members, and yielding means to move the friction member out of operative engagement with the driving members.

6. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with a plurality of oppositely disposed and concentric gears, a hollow and slotted shaft located between the driving members, a plurality of driving pinions mounted on said hollow shaft and meshing with said gears, a driving shaft in said hollow shaft, a key carried by said driving shaft and projecting through the slot in the hollow shaft, said key being beveled reversely on its front and rear faces and adapted to be locked to any one of said pinions, and means for adjusting the slidable shaft to shift the friction member into operative engagement with one or the other of said driving members.

7. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with a plurality of oppositely disposed and concentric gears, a hollow and slotted shaft located between said driving members, a plurality of driving pinions mounted on said hollow shaft and meshing with said gears, said pinions being provided with reversely inclined cams on their hubs, a driving shaft in said hollow shaft, a key carried by said driving shaft and adapted to be locked to any one of said pinions, and means for adjusting the slidable shaft to shift the friction member into operative engagement with one or the other of said driving members.

8. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with a plurality of oppositely disposed and concentric gears, a hollow and slotted shaft located between said driving members, a plurality of driving pinions mounted on said hollow shaft and meshing with said gears, said pinions being provided with a pair of reversely inclined cams on their hubs, a driving shaft in said hollow shaft, a key carried by said driving shaft and adapted to engage said cams and to be locked to any one of said pinions, and means for adjusting the slidable shaft to shift the friction member into operative engagement with one or the other of said driving members.

9. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being provided with a plurality of oppositely disposed and concentric gears, a hollow and slotted shaft located between said driving members, a plurality of driving pinions mounted on said hollow shaft and meshing with said gears, said pinions having their hubs provided with slots to register with the slot in the hollow shaft and having reversely inclined cams between said slots, a driving shaft in said hollow shaft, a key carried by said shaft and projecting through the slot in the hollow shaft, said key being beveled reversely on its front and rear faces and adapted to be locked to any one of said pinions, and means for adjusting the slidable shaft to shift the friction member into operative engagement with one or the other of said driving members.

10. In a speed mechanism, the combination of a hollow shaft, a slidable shaft in said hollow shaft, a friction member mounted on the hollow shaft and locked to the slidable shaft, driving members mounted on the hollow shaft at the ends of the friction member, said driving members being made in the form of disks and provided with seats for the ends of the friction member and having a plurality of concentric series of teeth forming oppositely disposed gears, a plurality of pinions each meshing with a gear on each driving member, a driving shaft, means for locking said driving shaft to any one of the pinions, means for adjusting the slidable shaft to shift the friction member into operative engagement with one or the other of said driving members and a brake device to operate on said friction member.

FREDERICK H. HODGKINS.

Witnesses:
WM. O. BELT,
M. A. KIDDIE.